Aug. 8, 1967

A. C. MULDER ETAL  3,335,259

DYNAMIC CHARACTERISTIC CONTROL FOR DIRECT CURRENT
ARCS AND APPARATUS THEREFOR

Filed Sept. 30, 1960

INVENTORS.
ALLAN C. MULDER
REIDAR P. C. RASMUSEN
BY
ANDRUS & STARKE
Attorneys

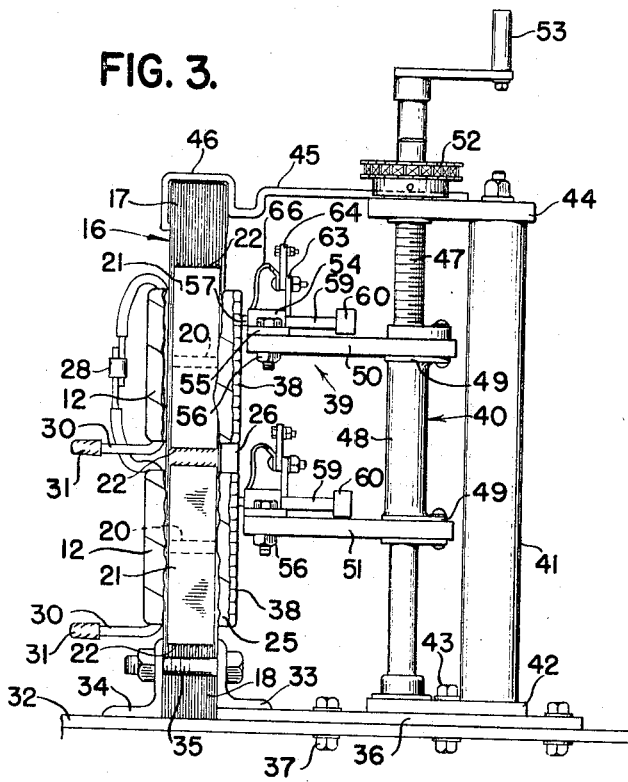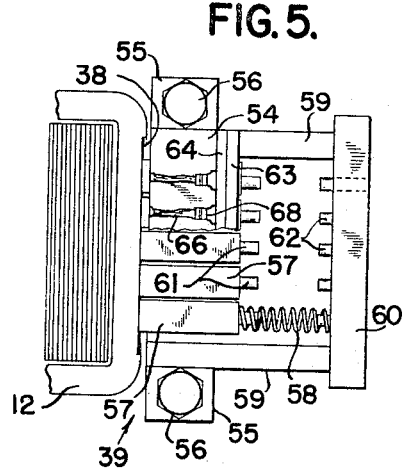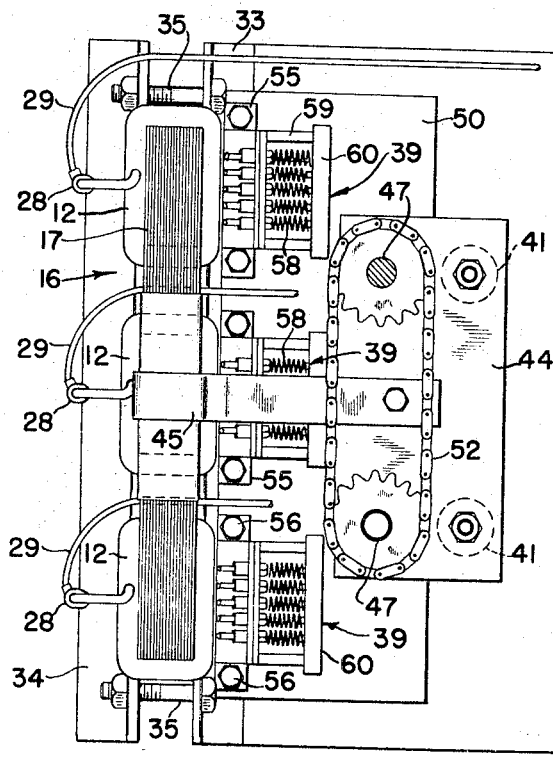

United States Patent Office 3,335,259
Patented Aug. 8, 1967

3,335,259
DYNAMIC CHARACTERISTIC CONTROL FOR DIRECT CURRENT ARCS AND APPARATUS THEREFOR
Allan C. Mulder and Reidar P. C. Rasmusen, Appleton, Wis., assignors to Miller Electric Manufacturing Company, Appleton, Wis., a corporation of Wisconsin
Filed Sept. 30, 1960, Ser. No. 59,698
14 Claims. (Cl. 219—131)

This invention relates to a dynamic characteristic control of direct current arcs and particularly to an inductive reactance control incorporated in a direct current arc welding current source having an adjustable constant potential transformer and output rectifier adapted to establish a direct current suitable for joining metal parts and the like.

Welding processes are presently employed for joining many different metals. Direct current (hereinafter referred to as D.C.) arc welding employs a steady D.C. welding current in the arc. One conventional D.C. power source includes a transformer supplying alternating current (hereinafter referred to as A.C.) to a full-wave rectifier which establishes a D.C. current supply to the arc. The various welding processes employ different electrodes to establish a predesigned weld and shielding mediums to protect the arc from surrounding foreign elements during creation of the weld.

The arc stability is noticeably dependent upon the static volt versus ampere output characteristic of the welding supply and for the various welding processes different characteristics are desirable. Further, the dynamic characteristic of the welding circuit in the presence of the arc for any one power supply will vary depending upon the level of the welding current.

Constant potential power sources wherein the volt-ampere curve has a relatively straight line static characteristic have found relatively wide application in various welding processes. Constant potential power sources providing current self-regulation in accordance with the size of the electrode and the rate of electrode feed are particularly adapted to modern welding processes. The level of the welding current may be controlled by adjusting the open circuit voltage of the constant potential power supply and through the addition or subtraction of a series reactance in the secondary circuit. The constant potential power sources are particularly well adapted to the various gas shielded metal arc welding processes.

An exceptionally satisfactory constant potential welding unit is disclosed in the copending patent application of the present applicants entitled, Arc Welding Transformer Power Supply, with Ser. No. 829,581 which was filed on July 27, 1959, now Patent No. 3,016,484. In the above application, a constant potential transformer connects the commercial power lines to a full-wave rectifier to establish a D.C. current suitable for arc welding. The welding current is adjusted however by novel sliding contact construction on the primary side of the transformer to maintain a low reactance circuit. This application also notes that a controlled inductive reactance inserted between the transformer and the rectifier stabilizes the arc over and above that incident the particular construction of the constant potential transformer. However, applicants have found that the inductive reactance for establishing the optimum dynamic characteristics for different welding currents require fine changes in the inductive reactances. For any given welding process such as the conventional gas shielded process employing a given current and wire feed for a selected electrode size, a particular combination of an open circuit voltage and a slope characteristic provides the most stable arc conditions. The present invention provides an arc welding machine wherein the open circuit voltage is adjusted to stabilize the arc and then the slope characteristic is adjusted to further stabilize and establish an optimum arc. Thus, both fine voltage adjustment and slope adjustment can be made during welding, making possible selection of the exact combination of characteristics required for producing the very best arc in any particular application.

In accordance with one aspect of the present invention, an adjustable reactance means is connected in series in the output circuit between an adjustable constant potential power source and a full-wave rectifier. The adjustable reactance means is selected with a minimum impedance and permits a continuous adjustment of the reactance inserted into the circuit. The welder may then strike the arc and by adjustment of the power source and the reactance means readily and quickly establish the most desirable arc characteristic. The arc characteristic is adjusted to eliminate undesirable hunting and burn-back in a rapid and accurate control.

The adjustable reactance means inserted in the circuit is to be distinguished from the conventional current adjusting reactor which has found wide application for regulating the amplitude of the welding current as previously noted. The reactance means, in accordance with the present invention, does not primarily affect the amplitude of the arc welding current but rather varies the slope and adjusts the operating point. Thus, the reactance means is selected to have a relatively low impedance such that the reactance means provides only a continuously varying dynamic characteristic control.

The reactance means is connected in the arc welding circuit which results in relatively heavy current flow through the reactance means and care must be taken to accommodate these heavy welding currents. The control must also allow rather fine adjustment of the reactance means in a simple and readily operated manner in the presence of an arc and the heavy welding current flow and should establish a very linear system.

A variable air gap structure is not adapted to easy control while welding. Internal taps within the welding machines to change the coil connection would not permit the desired control while the arc is established. Further, to make internal electrical changes normally requires licensed electricians and the welding operator could not make the change directly. The changes would be both time consuming and uneconomical in commercial practice. To provide tap switches externally of the machine for interconnecting the several turns of the reactance means results in a rather complicated and cumbersome wiring system. The many switches which would be required are not conducive to ready control while the arc is being held. As previously discussed, the relatively heavy welding current flows through the reactance control and consequently, switching would be difficult.

In accordance with the present invention as applied to a three-phase power system, a core structure is provided having at least three different flux paths, each of which is interlinked by a pair of coils arranged in stacked relationship. Similar sliding brush contacts are provided engaging each of the coils. Each pair of coils is adjustably connected in parallel with each other and in series with the welding current. The parallel coil connection reduces the current density per brush contact and also reduces the size of the conductor which must be employed in forming the reactor coils. Consequently, the coils can be readily fabricated and the brushes moved to engage successive turns of the coils without abnormal and damaging arcing between the contacts and the coils. The brushes are interconnected by a suitable movable supporting means for simultaneous movement axially of the separate coils.

The supporting means is movably mounted for manual adjustment or the like.

Each of the brush units for the coils consists of a plurality of brushes slidably journaled within a brush holder and resiliently biased into firm, positive engagement with a turn of the coil. A plurality of brushes establishes a plurality of contact points and insures firm and positive low contact resistance between the brushes and the coils. A contact strip is mounted on the movable mounting means and preferably directly onto the brush holder.

Short brush leads are connected to the brush holder immediately contiguous to the adjacent coil and connected at the opposite end to the contact strip. The short leads by-pass or shunt the current about the holder including the resilient biasing means. This eliminates the flow of the heavy welding current through the brush holder and the resilient means and eliminates the substantial heating of these members which would occur if they carried welding current. The brush lead location also minimizes shunt current flow between adjacent turns bridged by the brushes and providing continuous and smooth reactance change when moving the brushes.

The drawings furnished herewith illustrate the best mode presently contemplated for carrying out the invention.

In the drawings:

FIG. 3 is a side elevational view of the adjustable reactor shown in FIG. 2;

FIG. 4 is a top elevational view of the adjustable reactor shown in FIG. 2;

FIG. 5 is an enlarged top view of a brush assembly with parts broken away to show the brushes; and FIG. 6 is an enlarged vertical section through a brush assembly shown in FIGS. 3 and 4.

Figure 1:
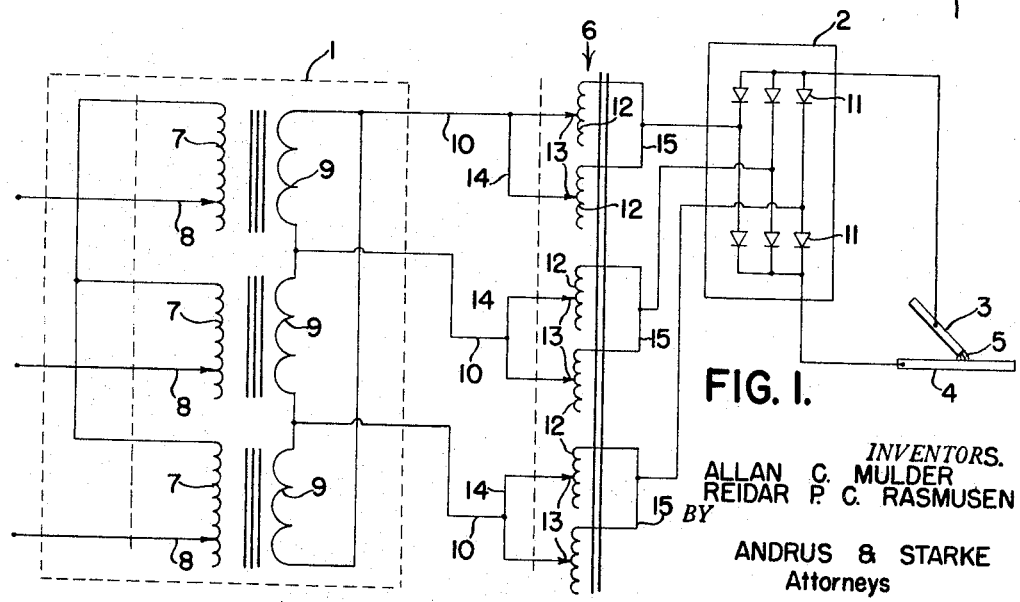
FIG. 1 is a schematic circuit diagram of a D.C. arc welding power supply having a three-phase alternating current input.

Referring to the drawings, and particularly to FIG. 1, a direct current arc welding current supply is illustrated including a three-phase transformer 1 preferably of the constant potential variety which is adapted to be connected to an alternating current power source, such as conventional commercial power distribution lines, to supply alternating current at a suitably reduced voltage to a full-wave rectifier assembly 2. An electrode 3 and a work member 4 are connected to the output terminals of the rectifier 2. When the power supply circuit is completed, an arc 5 is established and maintained between the electrode 3 and the work 4. An adjustable dynamic characteristic control reactor 6 is connected in series in each of the lines between the transformer 1 and the rectifier 2. The reactors 6 are adjusted for each setting of the welding current to establish and maintain arc 5 as a very stable arc.

The illustrated transformer 1 includes three primary coils 7 which are connected in a standard Y connection. Movable brush contacts 8 are slidably mounted on the primary coils 7 and connected to the incoming power supply, not shown, to adjustably connect the primary coils to the power supply. Three secondary coils 9 are magnetically coupled one with each of the primary coils 7. The secondary coils 9 are internally connected in a standard delta connection and connected by three output phase lines 10 to the rectifier 2.

The primary coils 7 and the secondary coils 9 are closely coupled to establish a constant potential output. The output voltage of the transformer 1 is adjusted by simultaneous movement of the taps 8 which are suitably ganged for corresponding movement on the primary coils 7. The transformer 1 is constructed with a minimum of inductive reactance for optimum results as subsequently described. Applicant's copending application previously referred to is a preferred construction.

The rectifier 2 is a three-phase, full-wave rectifier including three parallel branches each containing a pair of similar rectifying devices 11 which conduct current in only one direction. The pairs of rectifying devices 11 are similarly polarized and the ends of the parallel branches are interconnected to each other and to the electrode 3 and the work 4 to establish a direct current output in a well known manner. The output lines 10 from transformer 1 are connected intermediate each of the three parallel branches to establish the conventional three-phase A.C. input.

The stability of the arc 5 between the electrode 3 and the work 4 depends upon both the static and the dynamic characteristics of the welding circuit. In addition to the voltage and current for the arc, the slope at the particular setting is extremely important. For different welding processes, the current output should drop rather rapidly with a decreasing voltage across the arc 5. In other welding processes, the current should drop more slowly. In accordance with the present invention, the dynamic characteristic control reactors 6 are adjustably connected in each of the three output lines 10 to establish with the adjustable transformer 1 conjoint adjustable control of the characteristic to obtain optimum welding conditions.

The individual dynamic characteristic control reactors 6 in the illustrated embodiment of the invention include a pair of similar reactor coils 12 each having an adjustable contact 13 which is adapted to engage successive turns on the corresponding coil 12. A jumper lead 14 connects the adjustable contacts 13 to each other and to the output line 10 from the transformer secondary coil 9. A similar jumper lead 15 connects corresponding ends of each of the pairs of coils 12 together and to the input to rectifier 2. The coils 12 are thus connected in parallel with each other and adjustably connected in series in the output lines 10 between the transformer secondary coils 9 and the rectifiers 2. The contacts 13 are simultaneously adjusted to vary the effective turns of the coils 12 which are connected in series with the arc 5. The coils 12 are designed to have a very low impedance such that the variation in the effective turns does not appreciably affect the magnitude of the welding current flowing through the arc 5. However, the slight change in this low impedance provides very accurate control of the inductive reactance added to the circuit and markedly affects the dynamic characteristics of the arc.

The pair of coils 12 in each circuit reduces the size of the conductors which must be employed and also reduces the current density carried by the contacts 13. The construction therefore simplifies the fabrication and electrical design of the dynamic characteristic control reactors 6.

Figure 2:
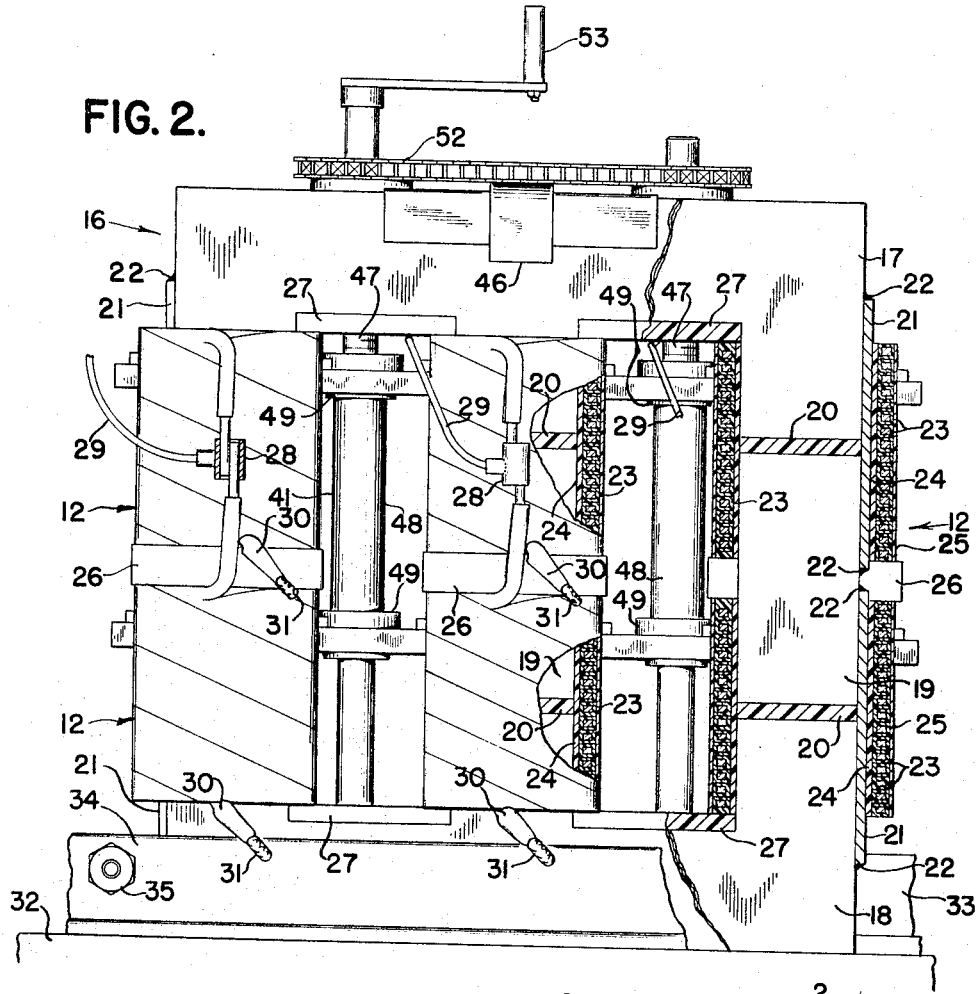
FIG. 2 is a front elevational view with portions broken away of an adjustable dynamic characteristic control reactor shown schematically in FIG. 1.

Referring particularly to FIGS. 2–4, a generally unitized reactor construction incorporating the three individual reactors 6 shown in FIG. 1 is illustrated in accordance with one aspect of the present invention.

The illustrated generally unitized construction includes a laminated co-planar magnetic core 16 having three leg portions. Core 16 is formed of upper and lower E-shaped core members 17 and 18 mounted with aligned facing stub portions or extensions which are separated by individual magnetic core spacers 19. Non-magnetic fillers 20 are interposed between adjacent end faces of the spacers 19 and the E-shaped members 17 and 18 to form upper and lower air gaps in each leg or magnetic path of core 16.

Small bridging strips 21 span the air gaps formed by fillers 20 immediately adjacent the opposite vertical end walls of core 16 and are respectively secured to the adjacent E-shaped members 17 and 18 and to the core spacers 19, as by welds 22. Strips 21 mechanically tie the core structure into a stable mechanical core unit. The core spacer 19 and non-magnetic fillers 20 in the central leg portion are clamped in place when strips 21 are applied and are not positively tied together, in the illustrated embodiment of the invention.

Although bridging strips 21 form a slight magnetic bridge about the adjacent air gaps, the bridging effect is relatively small and does not adversely affect the operation of the reactors 6. Air gaps are established within each coil 12 which therefore have essentially the same reactance in all corresponding positions on the coils 12.

Each pair of coils 12 shown in the reactors 6 of FIG. 1 are assembled with the corresponding leg portions of the three-legged core 16 prior to establishment of welds 22.

Each of the illustrated coils 12 constitutes a single-layer, multi-turn coil which is formed of a relatively heavy conductor having an outer insulating varnish 23 covering the conductor. The terminal ends of the conductor forming each coil 12 is disposed to one side of the coil outwardly of core 16, as most clearly shown in FIGS. 2–4. The coils 12 are formed as tubular members having a rectangular cross section generally corresponding to the cross section of the vertical portions of the three-legged core 16. In accordance with conventional practice, an insulating liner 24 is concentrically arranged within each coil 12 and a suitable electrical insulating tape 25 is wound about the exterior of the coil to protect the coil.

Center insulating blocks 26 are provided between the adjoining end turns of each pair of coils 12 and end insulating spacer 27 are provided between the opposite end turns of the coils 12 and the adjacent surfaces of core 16.

Standard crimp-type connectors 28 or the like connect the upper terminal ends of each pair of phase coils 12 to each other and a connecting lead 29 connects the corresponding ends of the coil pairs to rectifier 2 in FIG. 2. The leads 29 for the leftmost coils 12 in FIG. 2 extend exteriorly around the core 16 for connection to the rectifier 2. The leads 29 for the center coils 12 and for the rightmost coils 12 in FIG. 2 extend back through the windows or openings in the core 16 to effectively cancel the initial half turn in coils 12, as more fully described hereinafter. The free or lower terminal ends 30 of coils 12 are covered with a suitable insulating tape 31.

The core 16 and coils 12 are secured to a base or support 32 by L-shaped mounting brackets 33 and 34 which are clamped to the opposite sides of the lower end of the three-legged core 16 by suitable bolts 35 extending through the angle braces on both sides of core 16. The laterally extending leg of the mounting bracket 33 is raised above the lower surface of the bracket 34 and the core 16 by the depth of a mounting plate 36 which projects beneath the bracket 33 into abutting relation to core 16. The mounting plate 36 is secured to the bracket 34 and to base 32 of a housing structure, not shown, by suitable bolt and nut units 37.

The tape 25 and the insulating varnish 23 are removed from the coil face opposite the terminal ends of the coils and the bared conductors are ground flat and smooth to establish sliding contact face 38, as shown most clearly in FIGS. 3–5.

A plurality of slide wire brush assemblies 39, constituting the adjustable contacts 13 of FIG. 1, are slidably mounted adjacent sliding contact faces 38 for adjustment of the effective coil turns connected in circuit. The sliding contact faces 38 are opposite the terminal ends of the coils 12 to prevent interference with the movement of brush assemblies 39.

The brush assemblies 39 are adjustably supported by a manually controlled brush positioner 40 for axial movement with respect to the associated coils 12. The illustrated positioner 40 for the brush assemblies 39 is generally similar to the primary contactor assembly shown in the previously identified copending application of Mulder and Rasmusen. Generally, supporting posts 41 are secured to a lower bearing plate 42 and project upwardly therefrom in spaced parallel relation to the core 16. Suitable bolt and nut units 43 rigidly secure the bearing plate 42 to the main mounting plate 36. An upper bearing plate 44 is bolted or otherwise rigidly secured to the upper ends of the supporting posts 41 and projects inwardly toward the core 16.

In the illustrated embodiment of the invention, a core clamp 45 is shown attached to the upper bearing plate 44 and projects outwardly over the core 16 terminating in a U-shaped portion 46 which tightly fits over the top of the core 16. The core clamp 45 stabilizes the mounting of the core 16 and the positioner 40.

A pair of lead screws 47 are journaled in the lower and upper bearing plates 42 and 44 between the core 6 and the supporting posts 41. A tubular and internally threaded follower 48 is similarly threaded onto each of the lead screws 47. Semi-circular flanges 49 are welded or otherwise rigidly secured to the opposite ends of the followers 48 and create horizontal mounting surfaces. An upper brush supporting plate 50 and a lower brush supporting plate 51 are bolted respectively to the upper and lower flanges 49 for simultaneous vertical movement with the followers 48. The axial length of the followers 48 and the thickness of the brush supporting plates 50 and 51 are selected to substantially space the upper surfaces of the plates 50 and 51 in accordance with the spacing of corresponding turns of the stacked coils 12.

The brush assemblies 39 are secured to the upper surfaces of the plates 50 and 51 for simultaneous and similar positioning with respect to the associated coils 12.

As shown most clearly in FIGS. 3 and 4, a chain and sprocket connection 52 interconnects the upper end of the lead screws 47 to establish synchronous movement of followers 48. A manually operable handle 53 is secured to one of the lead screws 47 and rotation of the handle simultaneously drives both lead screws 47 and the carried followers 48 to simultaneously position brush assemblies 39.

Referring to FIGS. 3–6 and particularly to FIGS. 5 and 6, each of the illustrated brush assemblies 39 includes a brush holder 54 having a rectangular opening extending laterally of coil 12. The rectangular opening is generally coextensive with the width of the sliding contact face 38 and with the depth of a single turn of the conductor forming the coil 12. Suitable flanges 55 extend laterally from the brush holder 54 and are secured to the mounting plates 50 and 51 by bolts 56 with the rectangular openings aligned with the sliding contact faces 38. Five individual brushes 57 are slidably journaled within the opening and urged into contact with the sliding contact face 38 by five individual coil springs 58. The five individual brushes 57 establish and assure a multiple point contact and reduce the interface resistance to a very minimum.

A pair of rearwardly projecting arms 59 are welded or otherwise secured to the holder 54. A spring pressure bar 60 is bolted or otherwise releasably secured to the ends of arms 59 and constitutes a stop for the outer ends of the individual springs 58. Each of the springs 58 acts between the back surface of the associated brush 57 and the pressure bar 60 to continuously urge the associated brush into engagement with the aligned turn or turns of the coil 12. Tubular brush spring guides 61 and 62 project toward each other from the end of the brush 57 and the pressure bar 60 through the coil spring 58 to maintain the coil springs in place.

A contact mounting plate 63 is welded to the back edge of the upper plate of holder 54 and projects vertically upwardly therefrom. A connecting strip 64 is secured to the upper end of the mounting plate 63 by five bolt and nut units 65 which are laterally spaced along the mounting plate 63 in alignment with the five individual brushes 57. Relatively short brush leads 66 are welded as by welds 67 to the forwardmost portion of the upper plate of the holder 54. The upper end of each brush lead 66 terminates in an eye-type lug 68 which is attached to the strip 64 by the bolt and nut units 65.

A bolt type connection 69 is provided for securing the strip 64, and consequently, the brushes 57, to the jumper lead 14, also shown in FIG. 1, for interconnecting the brushes of each phase in the output line 10 from the transformer secondary coils 9. The brushes 57 fit relatively closely within the opening of the brush holder 54 to establish to low resistance path between the brush 57 and the upper plate portion of the holder 54.

The brush leads 66 are relatively short members to maintain a low resistance path between the brush holder 54 and the connecting strip 64. The brush leads 57 carrying the current directly from the foremost end of brushes 57 to the connecting strip 64 and shunt the current essentially completely from the holder 54 and the individual pressure coil springs 58. Heating of the holder 54 and the springs 58 is minimized and the resistance inserted into the welding circuit is reduced to a negligible factor.

Further, the connection of leads 66 gives a low resistance axially of the brush 57 and a relatively high resistance vertically of brush 57. This reduces brush heating and reduces the shunt current between immediately adjacent turns which are bridged by the brushes, as shown in FIG. 6. A substantially smooth, continuous reactance change as the brushes 57 are moved is therefore established.

The operation of the illustrated embodiment of the invention is summarized as follows.

The welder presets the movable brush contacts 8 on the primary coils 7 to establish the desired output welding voltage and current. After the welding operator completes the welding circuit and strikes the arc 5 between the electrode 3 and the work 4, transformer brush contacts 8 may be further adjusted to establish the best arc 5 obtainable by voltage control. The control handle 53 is then actuated to move the brush assemblies 39 and adjust the connection of the coils 12 in the circuit. The changing of the connection of the coils 12 in the circuit changes the dynamic characteristics of the arc circuit and a skilled operator can readily determine when a most stable arc is established.

The manual adjustment provided is readily and continuously made. The dual coils 12 and dual sliding brush assemblies 39 result in a very low current density per brush assembly and allow changing of the coil connections in the presence of the large welding currents.

Referring particularly to FIG. 2, each coil 12 begins with the upper turn wound clockwise. The middle and right hand coils 12 therefore each have an initial half turn in the circuit between lead 29 and the brushes 57. The initial half turn of the left hand coil 12 does not however link core 16. Consequently, the coils 12 are not in balance. The leads 29 for the middle and the right hand coils 12 are extended back through the openings in core 16 to link the core in an opposite direction from the initial half turns and effectively cancel them from the circuit. The lead 29 for the left hand coil 12 is positioned in non-linking relation to the core 16 and the coils 12 are thereby effectively maintained in balance.

The short brush leads 66 appreciably minimize the resistance inserted in the circuit and consequently maintain the complete impedance of the dynamic control reactors 6 very small.

The present invention permits the operator to readily adjust the transformer or other power source to optimum operating voltage and then to further adjust the inductive reactance in the circuit to provide an optimum and stable arc. The inductive reactance adjustment to control the dynamic arc characteristic is essentially smooth and continuous and can readily be made with the heavy welding currents in the reactance control. The dynamic control reactors constituting one aspect of the present invention are readily fabricated and adapted to actual commercial production and uses.

Various modes of carrying out the invention are contemplated as being within the scope of the following claims particularly pointing out and distinctly claiming the subject matter which is regarded as the invention.

We claim:

1. In an arc welding current source, an adjustable A.C. voltage source and an output rectifier for supplying D.C. current to an arc, said source being adjusted to coarsely establish a stable arc characteristic, and inductive reactance connected in the output circuit of the adjustable A.C. voltage source and the input circuit of the rectifier and having a low impedance such that connection thereof will not effectively vary the amplitude of the output current of the rectifier, and means to vary the impedance of the reactance means in relatively small increments to further adjust the dynamic characteristic of the arc.

2. In an arc current source having an adjustable transformer substantially devoid of inductive reactance and an output rectifier connected to the transformer secondary for supplying an adjustable D.C. current to an arc, said source being adjusted to coarsely establish a stable arc characteristic, a reactor means connected between the transformer secondary and the output rectifier, said reactor means having a minimal impedance, and means to substantially continuously vary the impedance of the reactor means for varying of the slope characteristic of the arc current source without effectively varying the output current of the rectifier and thereby further adjusting the dynamic characteristic of the arc at the coarsely established arc characteristic.

3. In a three-phase current source having an adjustable three-phase A.C. voltage source and a three-phase full-wave rectifier connected to the source for supplying D.C. current to an arc, said A.C. voltage source being set to provide coarse adjustment of the characteristic of the current source and therefore of the arc, a reactor means having at least three separate windings connected one per phase in the output circuit of the adjustable A.C. voltage source and in the input circuit to the rectifier, said reactor means being constructed to insert a low impedance in each phase to allow varying of the slope of the source by changing of the reactor means connection without appreciably changing the welding current, and means to simultaneously vary the impedance of the separate windings of the reactor means to provide fine adjustment of the characteristic of the current source and thereby adjust the dynamic characteristic of the arc in the presence of the arc.

4. In a three-phase current source having an adjustable three-phase transformer with a three-phase secondary connected to a three-phase full wave rectifier for supplying D.C. current to an arc, said transformer being set to provide coarse adjustment of the characteristic of the current source and therefore of the arc, a reactor having three separate reactance windings connected one each in each of the connections of secondary to the full-wave rectifier, said reactance windings having a low maximum impedance to allow control of the characteristic of the source with negligible effect on the amplitude of the output, and means to simultaneously and similarly adjust the impedance of the reactance winding to provide fine adjustment of the characteristic of the current source and thereby adjust the dynamic characteristic of the arc in the presence of the arc.

5. In a three-phase current source, an adjustable three-phase transformer with a three-phase secondary and being substantially devoid of inductive reactance, a three-phase full wave rectifier connected to the secondary for supplying D.C. current to an arc, said A.C. voltage source being set to provide coarse adjustment of the characteristic of the current source and therefore of the arc, a reactor having three separate reactance windings connected one each in each of the connections of the secondary to the full-wave rectifier, said reactance windings having a low maximum impedance, and means to simultaneously and similarly adjust the impedance of the reactance winding to insert inductive reactance in the circuit and provide fine adjustment of the characteristic of the current source and thereby adjust the dynamic characteristic of the arc.

6. A variable reactor for a three-phase power supply having a three-phase adjustable voltage transformer of the constant potential variety and a full-wave rectifier connected by three-phase lines to the output of the transformer, a core structure having three-flux paths, three pairs of stacked coils disposed with one pair interlinking each of said flux paths, sliding contacts on each of said coils, mounting means supporting said sliding contacts arrayed to engage corresponding turns of each of said coils, adjustment means for moving said mounting means axially of said coils, connecting means interconnecting the sliding contacts of each pair of coils to each other to form a circuit connection for each pair of coils, connecting means connecting corresponding ends of each pair of coils to each other to form a second circuit connection for each pair of coils, and each pair of coils being serially connected in a different line between the rectifier and the transformer to adjustably insert inductive reactance into the circuit and stabilize an arc maintained from the power supply.

7. A variable reactor for a three-phase power supply having a three-phase adjustable voltage transformer of the constant potential variety and a full-wave rectifier connected by three-phase lines to the output of the transformer, a core structure having three-flux paths each having an air gap, three pairs of stacked coils disposed with one pair interlinking each of said flux paths, sliding contacts on each of said coils, mounting means supporting said sliding contacts arrayed to engage corresponding turns of each of said coils, adjustment means for moving said mounting means axially of said coils, connecting means interconnecting the sliding contacts of each pair of coils to each other to form a circuit connection for each pair of coils, connecting means connecting corresponding ends of each pair of coils to each other to form a second circuit connection for each pair of coils, and each pair of coils being serially connected in a different line between the rectifier and the transformer to adjustably insert inductive reactance into the circuit and stabilize an arc maintained from the power supply.

8. A variable reactor for a three-phase power supply having a three-phase adjustable voltage transformer of the constant potential variety and a full-wave rectifier connected by three-phase lines to the output of the transformer, a core structure having three-flux paths each having a pair of air gaps spaced in the direction of flux establishment, three pairs of stacked coils disposed with one pair interlinking each of said flux paths and with each coil encircling one of the spaced air gaps in the corresponding flux path, sliding contacts on each of said coils, mounting means supporting said sliding contacts arrayed to engage corresponding turns of each of said coils, adjustment means for moving said mounting means axially of said coils, connecting means interconnecting the sliding contacts of each pair of coils to each other to form a circuit connection for each pair of coils, connecting means connecting corresponding ends of each pair of coils to each other to form a second circuit connection for each pair of coils, and each pair of coils being serially connected in a different line between the rectifier and the transformer.

9. A variable reactor for a three-phase power supply having a three-phase adjustable voltage transformer of the constant potential variety and a full-wave rectifier connected by three-phase lines to the output of the transformer, a core structure having three-flux paths, sets of stacked similar coils disposed interlinking each of said flux paths, the coils for each flux path being connected in series, sliding contacts on each of said coils, a holder for each of said sliding contacts including resilient means urging the contacts into engagement with the coils, mounting means supporting said holders with the contacts arrayed to engage corresponding turns of each of said coils, positioning means connected to said mounting means for movement axially of said coils, connecting means for interconnecting the sliding contacts of each set of coils to each other and in one of said phase lines, brush leads connected to said connecting means and to the holder immediately adjacent the coils to essentially short circuit the brush holder, and connecting means connecting corresponding ends of each set of coils to each other and in the corresponding phase line to connect the coils in each set in parallel with each other and in series with the transformer and the rectifier.

10. A variable reactor for a three-phase power supply having a three-phase adjustable voltage transformer of the constant potential variety and a full-wave rectifier connected by three-phase lines to the output of the transformer, a three legged core having air gaps in each leg, a pair of reactor coils wound on each of said legs, each of said coils being formed from a continuous insulated conductor as a multi-turn and single layer rectangular coil with corresponding faces of the conductor bared to form a sliding contact surface, connection means to connect one of the corresponding ends of each pair of coils, six brush assemblies supported one each adjacent each of said bared faces, interconnected mounting means secured to the brush assemblies to support the brush assemblies in similar relation to the corresponding coil, means to move said mounting means axially of said coils each of said brush assemblies including a brush holder having a tubular guide portion immediately adjacent the coil corresponding to the depth and width of a single turn in the sliding contact surface and brush means slidably journaled in said guide portion, resilient means mounted within the brush holder between the back of the brush means and a stop wall to resiliently urge the brush means into contact with the coil, short brush lead means connected at one end to the brush holder immediately contiguous the coil, and second connection means to interconnect the ends of the brush lead means associated with each pair of coils, said first and second connection means adjustably connecting each pair of coils in parallel in a different one of the three-phase lines connecting the output of the transformer to the rectifier.

11. A variable reactor for a three-phase power supply having a three-phase adjustable voltage transformer of the constant potential variety and a full-wave rectifier connected by three-phase lines to the output of the transformer, a core structure having three flux paths, three pairs of stacked coils disposed with one pair interlinking each of said flux paths, each of said coils being of a multi-turn and single layer construction and being connected in series with the other of each pair, a plurality of brushes for each coil aligned in accordance with one turn of the enlarged face of the coil, brush holders having a tubular brush guide portion with an upper conducting portion immediately adjacent the coils and having bias means acting upon the outer portion of the brushes to urge the brushes into firm engagement with the coils, mounting means supporting said brush holders arrayed to engage a corresponding turn of the associated coil, positioning means for moving said mounting means axially of said coils to simultaneously and correspondingly position the brushes, brush leads connected to the guide portion of the brush holder immediately adjacent the coils, connecting means interconnecting the brush leads of each coil to each other and to the other corresponding coil, and connecting means connecting corresponding ends of each pair of coils to each other, said connecting means being adapted to be connected to the input of the rectifier and the output of the transformer to insert each pair of coils in a different phase of the power supply.

12. A variable reactor for a three-phase power supply having a three-phase adjustable voltage transformer of the constant potential variety and a full-wave rectifier connected by three-phase lines to the output of the transformer, an integral three-legged core having air gaps in each leg, a pair of reactor coils wound on each of said legs, each of said coils being formed from a continuous insulated conductor as a multi-turn and single layer rectangular coils with corresponding faces of the conductor bared, first connection means to connect one of the corresponding ends of each pair of coils to each other for common connection in the circuit, six brush assemblies supported one each adjacent each of asid bared faces, interconnected mounting means secured to the brush assemblies to support the brush assemblies in similar relation to the corresponding coil, means to move said mounting means axially of said coils, each of said brush assemblies including a brush holder having an opening corresponding to the depth of a single turn and extending generally coextensively of the coil, a plurality of brushes slidably mounted in the holder, individual springs mounted within each of the brush holders between the back of each brush and a stop wall to resiliently and individually urge the brushes into contact with the coil, a separate contact strip secured to each brush holder, a plurality of short brush leads each connected at one end to the brush holder immediately contiguous the coil and one of the brushes and at the opposite end to the contact strip to shunt current flow past the brush holder, and second connection means to interconnect the contact strips associated with each pair of coils, said first and second connection means being adapted to adjustably connect each pair of coils in parallel in a different one of the three-phase lines connecting the output of the transformer to the rectifier.

13. A variable reactor for a three-phase power supply having a three-phase adjustable voltage transformer of the constant potential variety and a full-wave rectifier connected by three-phase lines to the output of the transformer, a core structure including a pair of E-shaped core units mounted with aligned facing leg portions separated by core spacing units to define three flux paths with air gaps between all adjoining surfaces of the spacing units and the E-shaped core units, and supporting strips welded to the outer leg portions and the spacing units to tie the E-shaped core units together, three pairs of stacked coils disposed with one pair interlinking each of said leg portions and with each coil encircling an air gap therein, sliding contacts on each of said coils, mounting means supporting said sliding contacts arrayed to engage corresponding turns of each of said coils, adjustment means for moving said mounting means axially of said coils, connecting means interconnecting the sliding contacts of each pair of coils to each other to form a circuit connection for each pair of coils, connecting means connecting corresponding ends to each pair of coils to each other to form a second circuit connection for each pair of coils, and each pair of coils being serially connected in a different line between the rectifier and the transformer.

14. A variable reactor for a three-phase power supply, a three legged core having three leg portions defining a pair of openings, a pair of reactor coils wound on each of said legs as a multi-turn and single layer rectangular coil of a continuous insulated conductor with corresponding faces of the conductor bared to form a sliding contact surface, a terminal end of the coils being disposed on the side of the core opposite the contact surface, brush assemblies movably supported one each adjacent each of said bared faces, means to connect the brushes in circuit one per phase, and three connecting lead means one each joining the terminal ends of each pair of coils to form a three phase connection to the coils, two of said leads extending through openings into circuit connection and the third of said leads extending into direct circuit connection to thereby cancel the inductive effect of the first half turn in the corresponding coils.

References Cited

UNITED STATES PATENTS

| 2,463,105 | 3/1949 | Henniker | 336—149 X |
| 2,757,296 | 7/1956 | Bichsel | 321—8 X |
| 2,859,398 | 11/1958 | Johnson | 321—24 |
| 2,882,478 | 4/1959 | Hobart et al. | 321—25 |
| 2,891,210 | 6/1959 | Mulder | 321—25 X |
| 2,909,647 | 10/1959 | Glenn | 321—24 X |
| 3,016,484 | 1/1962 | Mulder | 336—117 X |
| 3,054,884 | 9/1962 | Manz | 219—131 |

FOREIGN PATENTS 943,843  6/1956  Germany.

RICHARD M. WOOD, *Primary Examiner.*

S. BERNSTEIN, L. McCOLLUM, R. A. ZAPPALA, A. J. GAJARSA, R. D. BLAKESLEE,
*Assistant Examiners.*

UNITED STATES PATENT OFFICE

CERTIFICATE OF CORRECTION

Patent No. 3,335,259 August 8, 1967

Allan C. Mulder et al.

It is hereby certified that error appears in the above numbered patent requiring correction and that the said Letters Patent should read as corrected below.

Column 11, line 4, for "asid" read -- said --; column 12, line 4, for "to", first occurrence, read -- of --; line 21, after "through" insert -- said --.

Signed and sealed this 19th day of November 1968.

(SEAL)
Attest:

Edward M. Fletcher, Jr.
Attesting Officer

EDWARD J. BRENNER
Commissioner of Patents